(12) United States Patent
Wurster

(10) Patent No.: US 8,286,365 B2
(45) Date of Patent: Oct. 16, 2012

(54) COOLING APPARATUS AND METHOD FOR COOLING OBJECTS FROM A COATING DEVICE

(76) Inventor: Gerd Wurster, Stuttgart (DE)

( * ) Notice: Subject to any disclaimer, the term of this patent is extended or adjusted under 35 U.S.C. 154(b) by 71 days.

(21) Appl. No.: 12/797,641

(22) Filed: Jun. 10, 2010

(65) Prior Publication Data

US 2011/0000651 A1    Jan. 6, 2011

Related U.S. Application Data

(63) Continuation of application No. PCT/EP2008/010610, filed on Dec. 12, 2008.

(30) Foreign Application Priority Data

Dec. 13, 2007   (DE) .......................... 10 2007 062 266

(51) Int. Cl.
  *F26B 11/05* (2006.01)
(52) U.S. Cl. ........................ 34/90; 34/218; 165/104.34
(58) Field of Classification Search .............. 34/90, 95, 34/210, 218; 165/104.34, 104.11
  See application file for complete search history.

(56) References Cited

U.S. PATENT DOCUMENTS

| 3,618,564 A | * | 11/1971 | Dungs et al. ................. 118/66 |
| 3,686,773 A | * | 8/1972 | Schreiner ........................ 34/203 |
| 4,309,171 A | * | 1/1982 | Gentry .......................... 432/163 |
| 4,619,050 A | * | 10/1986 | Klemm ........................... 34/278 |
| 4,624,636 A | * | 11/1986 | Willis ............................. 432/78 |
| 5,333,395 A | * | 8/1994 | Bulcsu ............................ 34/79 |
| 5,611,476 A | * | 3/1997 | Soderlund et al. .............. 228/42 |
| 5,911,486 A | * | 6/1999 | Dow et al. ........................ 34/74 |
| 6,227,189 B1 | * | 5/2001 | Dougherty ................. 126/21 A |
| 2011/0000651 A1 | * | 1/2011 | Wurster ................... 165/104.34 |

FOREIGN PATENT DOCUMENTS

| DE | 3131655 A1 | * | 2/1983 |
| DE | 43 28 301 C2 | | 3/1997 |
| EP | 770508 A2 | * | 5/1997 |
| EP | 1 080 788 A1 | | 3/2001 |
| FR | 2 575 940 | | 7/1986 |
| GB | 2 139 751 A | | 11/1984 |
| JP | 09173697 A | * | 7/1997 |
| JP | 2003161464 A | * | 6/2003 |
| WO | WO 92/09854 | | 6/1992 |

* cited by examiner

*Primary Examiner* — Stephen M. Gravini

(74) *Attorney, Agent, or Firm* — Harness, Dickey & Pierce, P.L.C.

(57) ABSTRACT

A cooling apparatus for cooling objects from a painting device is disclosed. The cooling apparatus comprises a housing enclosing a cooling zone, a transport device for transporting workpieces through the cooling apparatus along a transport direction from an entry region through the cooling zone and through an exit region. A heat exchanger is configured for cooling air from the cooling zone and to redirect cooled air into the cooling zone.

20 Claims, 4 Drawing Sheets

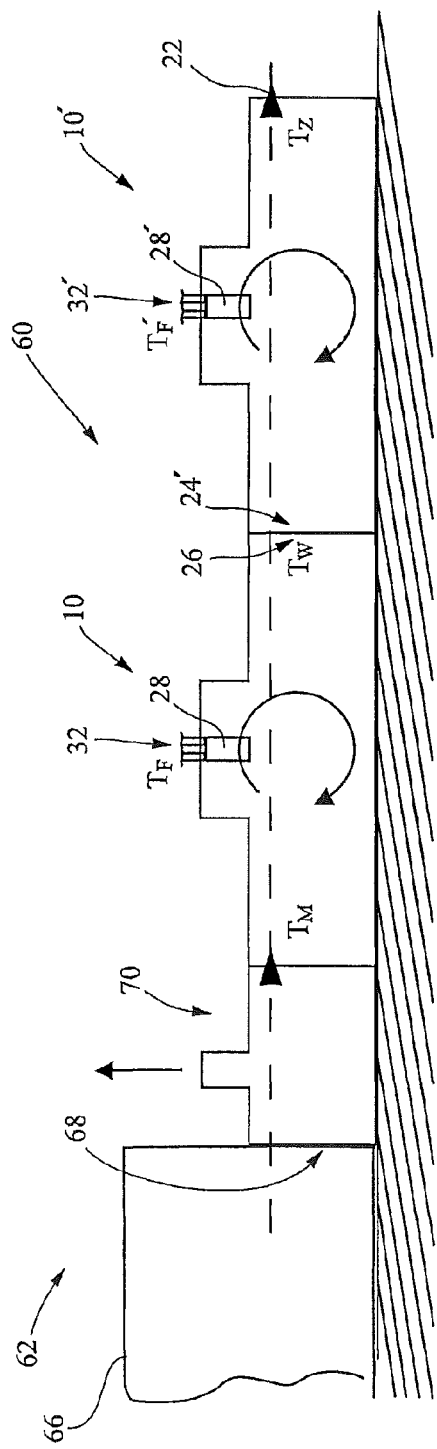

COOLING APPARATUS AND METHOD FOR COOLING OBJECTS FROM A COATING DEVICE

CROSS REFERENCE TO OTHER APPLICATIONS

The present application is a continuation of International PCT Application No. PCT/EP2008/010610, filed Dec. 12, 2008 which was published in the German language and claims priority to German Application No. 10 2007 062 266.1, filed Dec. 13, 2007. The entire contents of these priority applications are incorporated herein by reference.

BACKGROUND OF THE INVENTION

The present invention relates to a cooling apparatus, a cooling system and a method for cooling objects from a coating device. The invention relates, furthermore, to a coating plant with a drier and with a cooling system.

One of the techniques in widespread use in surface coating is painting. In painting, usually, a liquid or pulverulent coating substance or lacquer is applied thinly to the object to be painted. As a result of chemical and/or physical processes, a mostly continuous film is formed on the surface of the object. The film can then exert both technical actions, such as, for example, corrosion protection, and esthetic effects, such as, for example, a specific coloring.

A method in widespread use for producing specially high-quality and resistant paintings is stove enameling. In this case, the objects to be painted are heated before the painting operation. The lacquer applied to the objects can dry quickly and uniformly, thus resulting in a high-quality painting.

In the context of this application, the term "coating device" is to be understood as meaning a surface coating device, in which coating takes place either by means of a painting operation or by means of a powder coating operation. This term does not extend to a coating device in which an enameling operation or ceramic baking operation is carried out, this taking place at markedly higher temperatures which, as a rule, are considerably higher than 250° C.

It must be said that stove enameling is a highly energy-intensive method. On the one hand, the objects have to be heated in a drier or furnace after painting. This requires a considerable supply of energy, since the objects have to be heated as quickly as possible to the typical temperature of between 125° C. and 250° C., in particular between 150° C. and 200° C. After this stoving operation, the objects have to be cooled again, so as to be available for further machining processes. Heating and cooling give rise to a considerable outlay in energy terms, even though the object to be painted has approximately the same temperature at the entrance and at the exit of the coating plant (including the cooling).

In the past, it was proposed, for example for the cooling operation to introduce fresh air into a cooling apparatus and to allow the air heated by the objects to be cooled to flow into a storage depot which is to be heated. However, as a rule, the exhaust air from a cooling apparatus is not odor-neutral and may possibly also contain pollutant fractions which have remained.

SUMMARY OF THE INVENTION

In view of this it is a first object of the present invention, to disclose an improved cooling apparatus, an improved cooling system which provide for energy effiency.

It is a second object of the invention to disclose a method for cooling objects from a coating device, which is energy efficient and can make an effective contribution to reducing the energy demand during coating.

It is a third object of the invention to disclose a coating plant, advantageous in energy terms, with a drier and with a cooling system.

According to the invention these and other objects are achieved by means of a cooling apparatus for cooling objects from a painting device, with a housing which has a cooling zone, with a transport device which is designed for transporting the objects along a transport direction from an entrance region through the cooling zone to an exit region, and with a heat exchanger which is designed for cooling air from the cooling zone, the heat exchanger being connected to a fluid circuit to which the transfer of heat takes place.

These and other objects are also achieved by means of a cooling system with a first and with a second cooling apparatus which are designed in each case, as described above, an exit region of the first cooling apparatus being connected to the entrance region of the second cooling apparatus in such a way that the objects, after running through the first cooling apparatus, pass into the second cooling apparatus.

These and other objects are also achieved by means of a coating plant with a drier and with a cooling system, the cooling system being designed, as described above, and an exit side of the drier being connected to an entry side of a cooling system in such a way that at least part of a fresh-air supply into the drier is provided from the cooling system, this preferably taking place from the warmer side of the corresponding cooling zone (intake part). In this context, a coating plant is to be understood, in particular, as meaning a painting plant and/or a powder coating plant.

With respect to the method the object is achieved by means of a method for cooling objects from a coating device, comprising the following steps:
  transporting the objects through a cooling zone,
  during the transporting step, cooling of air from the cooling zone, in that air is branched off from the cooling zone, is cooled by means of a heat exchanger and is supplied to the cooling zone again on the countercurrent principle.

The fluid circuit in this case serves particularly with the heating of parts of the coating plant, in particular of pretreatment baths and/or supply-air plants.

The invention consequently follows a completely novel path for the cooling of painted objects, often also designated as substrates in the field of surface coating technology. While it has hitherto been assumed, in connection with coating plants, that the cooling of the air in the cooling zone is to be implemented best by means of air discharge or an air exchange, the invention shows the possibility of keeping the air essentially within a housing and of extracting the heat from the air within the housing. In this case, in particular, it will be possible to transfer the heat in the housing itself, so that no supply-air and exhaust-air ducts are required in this part or sector.

It has hitherto been assumed that heat recovery can be employed expediently only in conjunction with much higher temperatures, such as arise, for example during the baking of ceramic, in particular for steam generation by means of a turbine (see DE 43 28 301 C2), whereas recovery at comparatively low temperatures of a coating plant will be too complicated. The invention, however, indicates a possibility of reducing the exhaust air from the cooling apparatus and of operating the cooling apparatus with improved energy efficiency.

In order to achieve this, the cooling apparatus is designed in such a way that air is routed out of the cooling zone to a heat exchanger. Since the inlet temperature of the air preferably lies between 40° C. and 250° C., a multiplicity of known heat exchangers may be used. While the air is flowing through the heat exchanger, it transfers heat to the fluid circuit and is thus cooled. The air is then supplied at a lower outlet temperature to the cooling zone again. The novel concept can basically be adopted even at inlet temperatures of more than 250° C.

The air supplied from the cooling zone to the heat exchanger is preferably branched off from a front region of the cooling zone and, after flowing through the heat exchanger, is supplied to the cooling zone again on the countercurrent principle.

Efficient energy utilization is thereby ensured.

The energy absorbed by the fluid in the fluid circuit can then preferably be used for the heating of baths for the painting operation, the forward flow temperature then amounting, in particular, to 80° C. and/or the return flow temperature preferably amounting to 70° C. If the objects are already partially cooled and transfer less energy, the fluid may be used, in particular, for the heating of supply air, the forward flow temperature then amounting, in particular, to 40° C. and/or the return flow temperature preferably amounting to 30° C. A considerable part of the energy is consequently maintained in the system of the coating plant, so that improved overall energy efficiency is achieved.

The object initially mentioned is consequently achieved in full.

In a preferred refinement of the invention, the cooling apparatus has, furthermore, a cool-air conducting device, which routes air for cooling into the cooling zone, and a warm-air device which routes air warmed by the objects out of the cooling zone, the heat exchanger being arranged between the warm-air device and the cool-air device.

Thus, air circulating within the cooling zone and through the heat exchanger can be exactly defined. In this case, in particular, it can be determined at which point in the cooling zone the air having the inlet temperature is extracted and at which point the air having the outlet temperature is recirculated.

In a further preferred refinement, the cool-air device has a plurality of nozzles, in particular air nozzles, which are designed to inject the cooled air into the cooling zone opposite to the transport direction, the cool-air device being designed, in particular, as a duct system.

This refinement, on the one hand, allows an especially good heat transfer between the objects and the air in the cooling zone. On the other hand, what can be achieved thereby is that the air circulates essentially within the housing and only an insignificant part of the air leaves the housing through the entrance region and/or exit region. The cooled air is routed, in particular, via said duct system.

In a further preferred refinement, the heat exchanger is assigned a fan, in particular a radial fan, which generates an air stream through the heat exchanger.

This refinement makes it possible to control the air circulation in the housing. In interaction with the fluid circuit, different parameters, such as, for example the outlet temperature or forward flow temperature, can thus be varied. An especially compact type of construction can be achieved by means of a radial fan.

In a further preferred refinement of the invention, a filter element is arranged upstream or downstream of the heat exchanger.

The filter element makes it possible to ensure that the heat exchanger and also the objects or substrates are not contaminated or are contaminated to only a considerably reduced extent. It is preferably an exchangeable filter which, in particular, can be changed even during operation. Furthermore, it is preferable to use filters of filter class F7.

In a further advantageous refinement of the invention, the cool-air conducting device and the warm-air conducting device are deigned in such a way that the air is extracted in a front region of the cooling zone and is supplied in a middle and/or rear region of the cooling zone.

This refinement is advantageous in energy terms, since the air is extracted in the region of the cooling zone with the highest temperature, to be precise in the front region, and is supplied again in a cooler portion of the cooling zone, to be precise in the middle and/or rear region. The terms "front" and "rear" refer in this context to the transport direction, that is to say the objects enter the cooling zone at the front at the entrance region and leave the cooling zone at the rear at the exit region.

In a further preferred refinement of the invention, the transport device has a plurality of carrying elements, on which the objects can be transported, suspended or lying.

This refinement is advantageous, since the carrying elements can transport a multiplicity of different objects. Furthermore, it is thus possible to ensure that the largest part of the surface of the object comes intensively into contact with the circulating air in the cooling zone and is thus cooled rapidly.

In a further preferred refinement of the invention, the heat exchanger is arranged within the housing, in particular above the cooling zone.

This refinement is advantageous in energy terms, since the air is kept in the housing. Moreover, the housing can then be implemented more simply in structural terms. If required, the heat exchanger may also be designed as a separate circulating-air appliance uncoupled from the cooling zone.

In a further preferred refinement of the invention, a collecting trough for liquid is arranged below the heat exchanger.

This allows an especially simple cleaning of the heat exchanger, since cleaning liquid running down or dropping down is collected by the collecting trough. As a result, in particular, cleaning by means of a high-pressure cleaner, which allows fast cleaning even during operation, becomes easily possible.

In a further preferred refinement of the invention, the housing is closed off with respect to the atmosphere outside the housing so that essentially no air passes out of the cooling zone to the atmosphere.

This refinement ensures that only an insignificant fraction of heat leaves the cooling apparatus or the coating plant. What is thus achieved, on the contrary, is that the largest part of the energy does not leave the coating plant and therefore can be utilized further, for example in order to heat bath or supply-air plants. Furthermore, to improve the energy balance, it is advantageous if the cooling apparatus, in particular the housing, is partially or completely insulated, so that no or only minor heat emission takes place.

In a further refinement of the invention, the temperature of the objects in the entrance region is lower than 300° C., in particular lower than 200° C., and in the exit region is lower than 150° C., in particular lower than 120° C.

It became apparent that the invention is especially efficient in these temperature ranges.

In a further preferred refinement of the invention, the cooling apparatus is designed for cooling the objects from a temperature of between 300° C. and 100° C. to a temperature of between 150° C. and 40° C.

Even with these stipulations, the invention can be employed especially efficiently, while, to achieve this low temperature, a two-stage cooling system is especially advantageous, as also described below.

In a further preferred refinement of the invention, a fluid temperature in a fluid circuit is lower than 150° C., preferably lower than 120° C. and, in particular, lower than 100° C.

At this fluid temperature, the fluid circuit can have a structurally simple configuration, especially when the fluid is then still below its boiling temperature. This is the case particularly when the fluid is water and the fluid temperature is lower than 100° C.

In a further preferred refinement of the invention, a precooling zone is arranged upstream of the cooling apparatus, in particular upstream of the cooling apparatus which follows a drier of a coating plant.

This makes it possible in a simple way to discharge condensate from the drier or baking furnace, the transport device or the objects or substrates.

According to a further modification of the invention, air is branched off from the precooling zone via a blower and is recirculated into the preceding drier again on the countercurrent principle.

The advantage of this measure is that further improved energy utilization takes place, since the heat energy is utilized from a higher energy level (in the temperature range of the drier, for example at about 200° C.), this being more efficient than utilization in a cooling zone or at a heat exchanger. A clogging of the heat exchanger by residues is also counteracted.

In an advantageous refinement of the cooling system, a second heat exchanger of the second cooling apparatus is connected to a second fluid circuit, a second fluid temperature in the second fluid circuit being lower than 70° C., preferably lower than 60° C. and, in particular, lower than 50° C.

This refinement is especially suitable for obtaining heat for heating a supply-air plant.

In a further preferred refinement of the cooling system, the second cooling apparatus is designed for cooling the objects from the temperature of between 150° C. and 40° C. to a temperature of between 80° C. and 20° C.

In interaction with the already above-described properties of the first cooling apparatus, a two-stage cooling can thus be implemented, the first cooling zone cooling the objects from a maximum temperature to an intermediate temperature, and the second cooling zone cooling the objects from the intermediate temperature to a target temperature. This two-stage process is advantageous in energy terms and can be implemented structurally in a simpler way. Thus, in particular, instead of having large fans for the supply air and the exhaust air, in each case a small fan can be used in each of the cooling apparatus. In particular, it is in this case advantageous if the first cooling apparatus achieves a cooling of between 50 K and 90 K, in particular of between 60 K and 80 K, and the second cooling apparatus achieves a cooling of between 20 K and 60 K, in particular of between 30 K and 50 K.

Finally, one advantage of the coating plant initially described is that the fresh air into the drier is preheated by the high temperature in the first cooling zone. This is achieved particularly in that the warm-air conducting device sucks in the air from the cooling zone on the entry side of the cooling system, that is to say where the temperature is highest. The drier can then consequently suck in air which is 20 K to 160 K over the temperature of a conventional set-up. This means, in concrete terms, that a drier in a coating plant according to the invention can suck in the air at approximately 100° C., this temperature being only 20° C. to 60° C. in the prior art. The filters are used in the circulating-air circuit, preferably filtered air is supplied to the drier.

In a preferred refinement of the coating plant, the exit side of the drier coincides with an entry side of the drier.

The drier can consequently be configured as an outwardly essentially closed unit, so that the energy losses can be reduced and therefore the energy consumption lowered. Savings of 30% are possible in this case.

In a preferred refinement of the coating plant, the transport device is designed in such a way that the objects enter the coating plant through a cooling apparatus.

This gives rise, particularly in interaction with the above-mentioned refinement, to a further improved energy efficiency, since, on the one hand, the energy losses from the drier can be further reduced and, on the other hand, energy exchange can take place between the objects leaving the drier and the objects led to the drier.

It would be appreciated that the features mentioned above and those yet to be explained below can be used not only in the combination specified in each case, but also in other combinations or alone, without departing from the scope of the present invention.

BRIEF DESCRIPTION OF THE DRAWINGS

Exemplary embodiments of the invention are illustrated in more detail in the drawing and are explained in more detail in the following description. In the drawing:

FIG. 2 shows a first exemplary embodiment of a coating plant with a cooling system according to the present invention;

FIG. 3 shows a second exemplary embodiment of a coating plant with a cooling system according to the present invention.

DETAILED DESCRIPTION OF THE PREFERRED EMBODIMENTS

Figure 1:
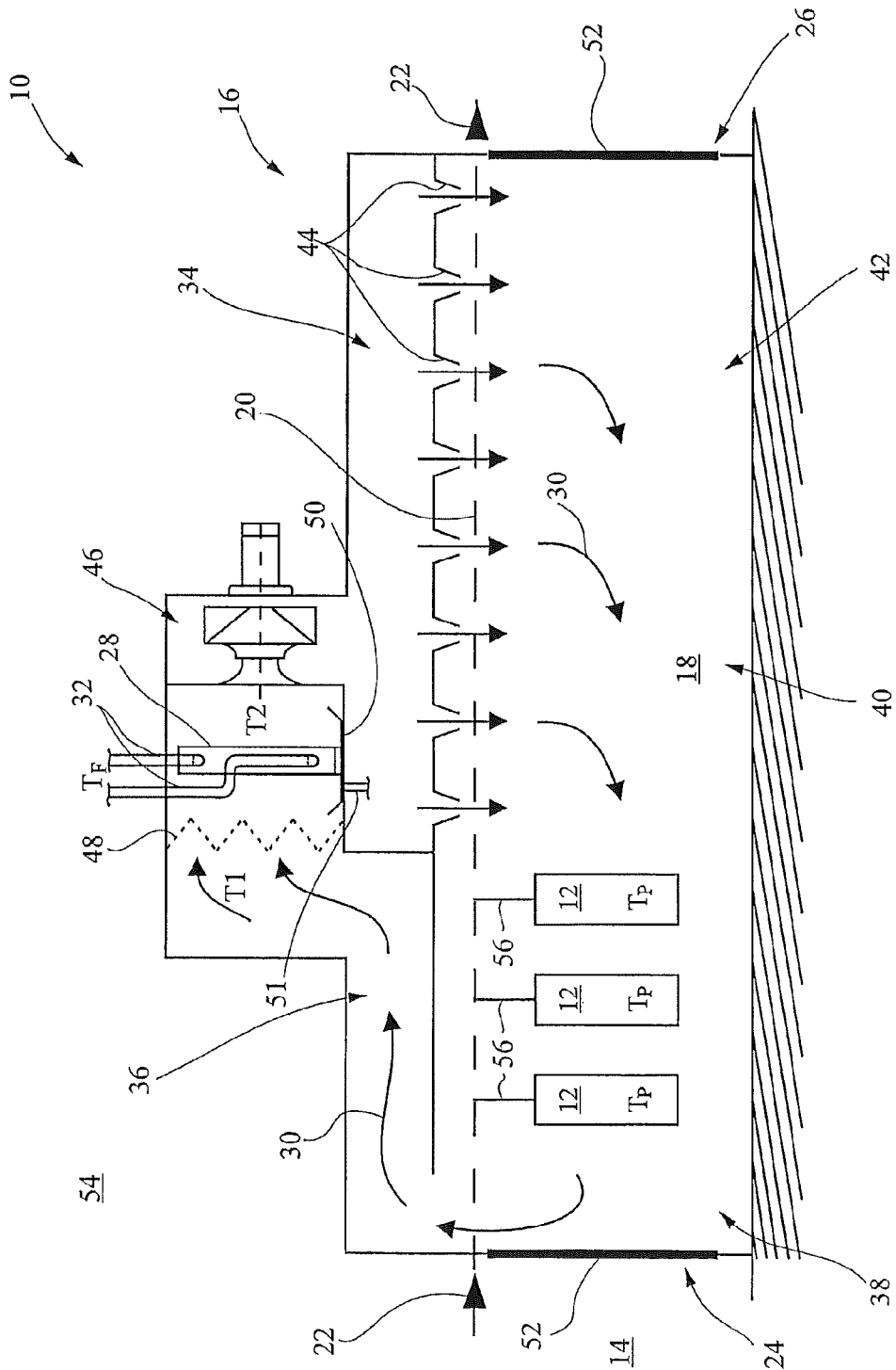
FIG. 1 shows an embodiment of the cooling apparatus according to the present invention.

FIG. 1 shows a cooling apparatus 10 for cooling objects 12 from a coating device 14, not illustrated in any more detail. The cooling apparatus 10 has an insulated housing 16 which has a cooling zone 18. Furthermore, the cooling apparatus 10 has a transport device 20 which is illustrated symbolically here by a roughly dashed line. The transport device 20 serves for transporting the objects 12 along a transport direction 22 which is illustrated symbolically here by arrow tips. Accordingly, the objects 12 are transported from an entrance region 24 through the cooling zone 18 to an exit region 26 and at the same time are cooled. Above the cooling zone 18 and within the housing 16 is arranged a heat exchanger 28 which is designed to cool air 30, indicated symbolically by the corresponding arrows, out of the cooling zone 18 from an inlet temperature $T_1$ to an outlet temperature $T_2$ with the transfer of heat. The heat exchanger 28 is connected to a fluid circuit 32, merely indicated, to which the transfer of heat takes place, the inlet temperature $T_1$ of the air 30 into the heat exchanger 28 lying between 40° C. and 250° C.

The cooling apparatus 10 has a cool-air conducting device 34, which routes air 30 for cooling into the cooling zone 18, and a warm-air conducting device 36 which routes the air 30 warmed by the objects 12 out of the cooling zone 18, the heat exchanger 28 being arranged between the warm-air conducting device 36 and the cool-air conducting device 34.

The cool-air conducting device 34 and the warm-air conducting device 36 are designed so that the air 30 is extracted in a front region 38 of the cooling zone 18 and is supplied to a middle and/or rear region 40, 42 of the cooling zone 18. In this case, the cool-air conducting device 34 has a plurality of (air) nozzles 44 which are designed for injecting the cooled air 30 into the cooling zone 18 opposite to the transport direction 22, the cool-air conducting device 34 being designed, in particular, as a duct system.

The heat exchanger 28 is assigned a fan 46 which generates an airstream through the heat exchanger 28. The fan 46 is designed here as a radial fan. Upstream of the heat exchanger 28 is arranged a filter element 48 which is indicated by a finely dashed line. The filter element 48 improves the air quality in the cooling zone 18 and protects the heat exchanger 28 against contamination.

Below the heat exchanger 28 is arranged a collecting trough 50 for liquid which receives a cleaning liquid for cleaning the heat exchanger 28 and discharges it via a discharge line 51.

By means of the lock elements 52, the housing 16 is closed off with respect to the atmosphere 54 outside the housing 16 so that essentially no air 30 passes out of the cooling zone 18 into the atmosphere 54. Finally, it may be pointed out that the transport device 20 has a plurality of carrying elements 56, on which the objects 12 can be transported, suspended or else lying.

The temperature $T_p$ of the objects 12 in the entrance region 24 is lower than 200° C. here and in the exit region 26 is lower than 120° C. The fluid temperature $T_F$ in the fluid circuit 32, more specifically in the forward flow of the fluid circuit 32, is lower than 100° C. Water is therefore preferably used here as fluid.

The cooling of the objects 12 in this case takes place as follows. The objects are brought into the cooling apparatus 10 in the entrance region 24 and are then transported through the cooling zone 18 to the exit region 26. After being sucked in via the warm-air conducting device 36, the air 30 from the cooling zone 18 is cooled, in that heat contained in the air 30 is transferred to the fluid circuit 32 by means of the heat exchanger 28. The air 30 cooled to the outlet temperature $T_2$ is then routed into the cooling zone 18 again via the cool-air conducting device 34. The heat discharged by means of the fluid circuit 32 is used elsewhere for the heating of, in particular, baths or supply-air plants, so that efficient energy utilization is afforded.

The efficiency of the cooling apparatus 10 according to the invention is brought to light particularly when a first and a second cooling apparatus 10, 10' are connected to form a cooling system 60. In this case, the exit region 26 of the first cooling apparatus 10 is connected to the entrance region 24' of the second cooling apparatus 10' in such a way that the objects 12, after running through the first cooling apparatus 10, pass into the second cooling apparatus 10'. In order to make this clear, two embodiments of coating plants 62, 62' are shown in FIGS. 2 and 3.

The coating plant 62 according to FIG. 2 has a drier 66 (also called a furnace), the exit side 68 of the drier being connected to a precooling zone 70 which is connected, in turn, to said cooling system 60. In the precooling zone 70, condensate adhering to the objects 12 can be discharged (symbolized by the vertical arrow) after they leave the drier 66.

After the objects 12 have run through the precooling zone 70, they pass into the first cooling apparatus 10. Here, the objects are cooled from a maximum temperature $T_M$ to an intermediate temperature $T_W$. The objects 12 then pass from the first cooling apparatus 10 to the second cooling apparatus 10'. Here, they are cooled from the intermediate temperature 10'. Here, they are cooled from the intermediate temperature $T_W$ to a target temperature $T_Z$. The cooling system 60 consequently implements a two-stage cooling process.

In contrast to the prior art, according to which the objects 12 to be cooled were cooled as quickly as possible at maximum outlay in technical terms, the cooling system 60 pursues the aim of carrying out the cooling in a two-stage process, even if the overall dwell time in the cooling system 60 is thereby increased. To be precise, it has been shown that the extended cooling process allows a very good transfer of heat to the respective fluid circuit 32, 32', so that the energy saving outweighs the costs possibly arising for a longer dwell time of the objects. For the coating plant 62 shown here, $T_M=170°$ C., $T_W=100°$ C. and $T_Z=60°$ C. are set.

Figure 2A:
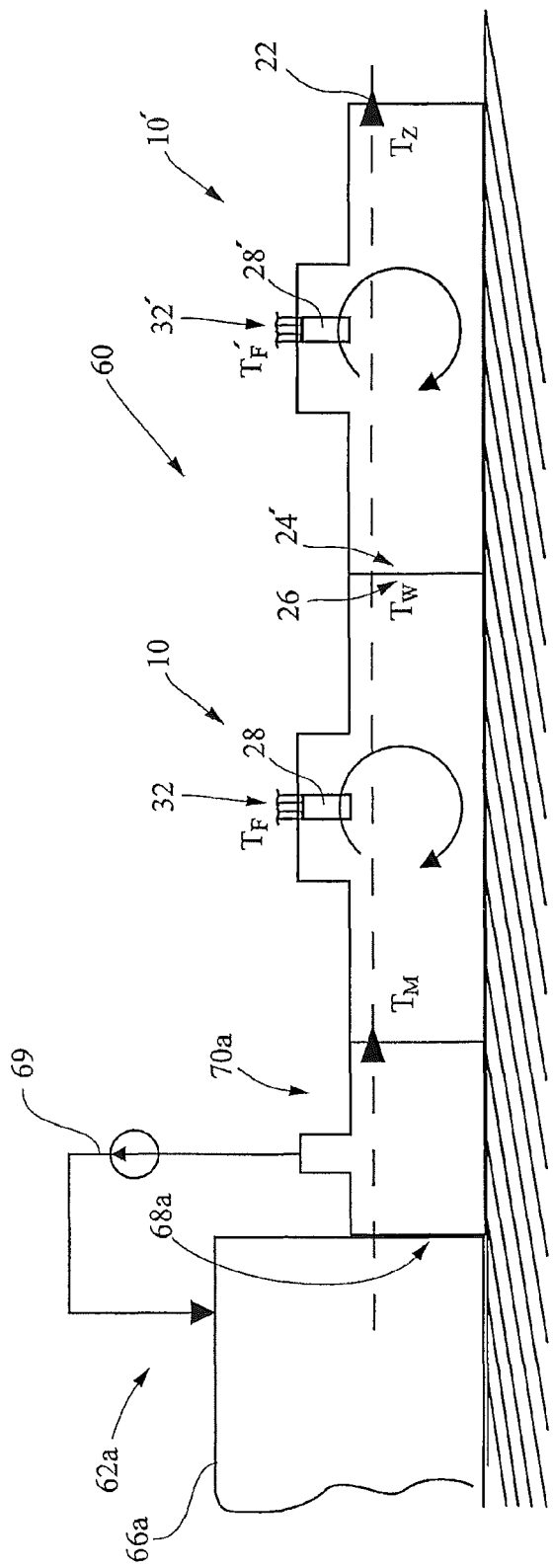
FIG. 2a shows a modified version of the exemplary embodiment shown in FIG. 2.

FIG. 2a illustrates a modification of the version according to FIG. 2. In this case, corresponding reference numerals are used for corresponding parts. Only the modified parts are identified by the addition "a". In FIG. 2a, the precooling zone 70a is modified, as compared with the version according to FIG. 2, in that not only is condensate discharged, but the air from the precooling zone 70a is partially recirculated again to the drier 66a of the coating plant 62a via a blower 69 on the countercurrent principle.

The advantage of this measure is that improved energy utilization takes place, as compared with the version according to FIG. 2, since the heat energy is utilized at a higher energy level (in the temperature range of the drier, for example at about 200° C.), this being more beneficial than utilization in a cooling zone or at a heat exchanger. Also, a clogging of the heat exchanger 28 by residues is counteracted. As in FIG. 2, the exit side 68a of the drier 66a is connected to the entrance of precooling zone 70a.

FIG. 3 illustrates a second exemplary embodiment of a coating plant 62'. The coating plant 62' has a drier 66', out of which the objects 12 are transported into the following cooling system 60' and finally pass into a conventional exhaust-air cooling apparatus 72. A special feature of the coating plant 62' is that a fresh-air supply 74, which is symbolized by the large arrows, is routed opposite to the transport direction 22 in the direction of the drier 66'. The effect of this is that a fresh-air supply 74 heated by the first cooling zone 18 passes into the drier 66'. This gives rise to the advantage, on the one hand, that especially good cooling is made possible in the cooling zones 18, 18' and, on the other hand, that the fresh-air supply 74 for the drier 66' has a markedly higher temperature than can be achieved in the case of a conventional fresh-air supply according to the prior art.

Figure 4:
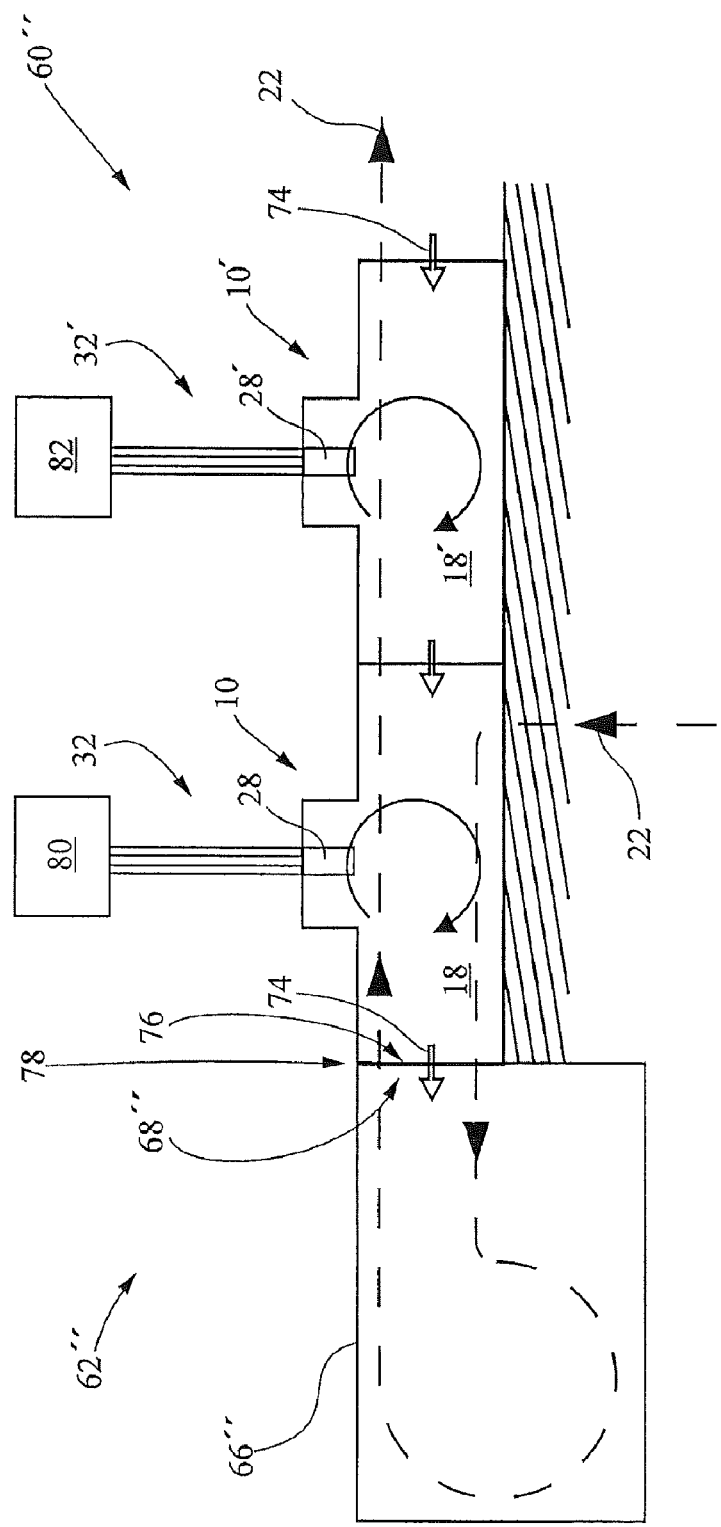
FIG. 4 shows a third exemplary embodiment of a coating plant with a cooling system according to the present invention.

Finally, FIG. 4 shows a third exemplary embodiment of a coating plant 62". The drier 66" is an outwardly essentially closed unit in which the entry side 68" and the exit side 76 coincide. That is to say, the objects enter the drier 66" at the interface 78 between the first cooling apparatus 10 and the drier 66" and also leave the drier 66" again at this interface 78.

Furthermore, it is shown that the objects 12 are introduced into the coating plant 66" through the first cooling zone 10. The objects 12 can also be introduced into the coating plant 62" through the second cooling zone 10'. The transport device 20" required for this purpose may be configured in many different ways.

This embodiment has two essential advantages. On the one hand, in the first cooling zone 10, heat exchange takes place between objects 12 transported to the drier 66" and objects 12 coming from the drier 66", because the objects 12 are routed through the same cooling zone 18, in particular are routed past one another. This improves the cooling of the hot objects 12 and preheats the cold objects 12.

On the other hand, the drier 66" can then obtain its air from the cooling zone 10. In particular, all the fresh-air intake points of the drier 66" are supplied with warm air. This embodiment can lead to considerable energy savings, particularly of the order of 30% of the drier energy. As shown in this figure, here too, a fresh-air supply 74 may take place through the cooling apparatuses 10, 10', but in this case the selected fresh-air supply 74 may be lower than in the previous exemplary embodiments.

Finally, in this embodiment, it is shown explicitly that the heat extracted from the first cooling zone is supplied to heating 80 for (pretreatment) baths, and that the heat extracted from the second cooling zone is supplied to heating 82 for supply-air plants. This heat utilization can also be implemented in the other coating plants 62, 62'.

Overall, it can be stated that the invention indicates a cost-effective possibility for heat recovery in conjunction with a coating plant 62, 62', 62", whereas the prior art had considered heat recovery in coating plants to be complicated and unviable. The invention also dispenses with achieving maximum possible cooling in the shortest possible time, since it was found, within the scope of the invention, that better heat recovery can be achieved if the cooling process is extended.

Furthermore, the two-stage concept affords the possibility of obtaining heat in two different temperature ranges in a simple way and thus taking into account the various heating requirements of a coating plant, in particular said baths and heatings for supply air. This gives rise, overall, to an energy-efficient system which even now operates in a more viable way than conventional systems. This advantage will be drastically enhanced with rising energy prices.

What is claimed is:

1. A cooling apparatus for cooling objects from a coating device, comprising:
    a housing enclosing a cooling zone, said cooling zone having an entrance region communicating with an exit region;
    a transport device extending though said housing for transporting workpieces along a transport direction through said entrance region, through said cooling zone and through said exit region;
    a heat exchanger arranged within said housing, said heat exchanger comprising an entry and an exit through which a first fluid flow is guided, and further comprising pipes for guiding a second fluid flow therethrough and for transferring heat between said first and second fluid flows;
    wherein said exit of said heat exchanger communicates with said cooling zone for supplying cooled air thereto; and
    wherein said entrance region of said cooling zone is connected with a warm air conducting duct leading to said entry of said heat exchanger for guiding warm air from said cooling zone through said heat exchanger and for recirculating air received from said cooling zone back into said cooling zone after transferring heat to said second fluid flow.

2. The cooling apparatus of claim 1, in which air supplied to said heat exchanger from said cooling zone has an inlet temperature of between 40° C. and 250° C.

3. The cooling apparatus of claim 1, wherein air removed at said entry region and supplied from said heat exchanger to said cooling zone again flows in a direction opposite to said transport direction.

4. The cooling apparatus of claim 3, further comprising:
    a cool-air conducting duct being connected to said exit of said heat exchanger at one end thereof and to said cooling zone at a second end thereof.

5. The cooling apparatus of claim 4, wherein said cool-air conducting duct comprises a plurality of nozzles which are configured for injecting cooled air into said cooling zone opposite to said transport direction.

6. The cooling apparatus of claim 1, wherein said heat exchanger further comprises a fan for generating an air stream through said heat exchanger.

7. The cooling apparatus of claim 1, wherein said heat exchanger is arranged within said housing.

8. The cooling apparatus of claim 1, wherein said housing is closed so that essentially no air passes from said cooling zone to the outside.

9. The cooling apparatus of claim 1, wherein workpieces passing through said entrance region have a temperature lower than 300° C.; and
    wherein workpieces leaving said exit region have a temperature lower than 150° C.

10. The cooling apparatus of claim 1, further comprising a precooling zone being arranged upstream of said cooling apparatus, as seen in the transport direction.

11. The cooling apparatus of claim 10, further comprising a drier arranged upstream to said precooling zone, wherein air is extracted from said precooling zone and is supplied to said drier.

12. The cooling apparatus of claim 1, further comprising an exhaust-air cooling apparatus being arranged downstream of said cooling apparatus, as seen in the transport direction.

13. A cooling system comprising a first cooling apparatus and a second cooling apparatus according to claim 1, wherein an exit region of said first cooling apparatus is connected to an entrance region of said second cooling apparatus so that workpieces first pass through said first cooling apparatus, and thereafter through said second cooling apparatus.

14. A coating plant comprising a drier and a cooling apparatus according to claim 1, wherein an exit side of said drier is connected to an entry side of said cooling apparatus so that at least part of a fresh-air supply into said drier is delivered from said cooling apparatus.

15. A cooling apparatus for cooling workpieces from a coating device, comprising:
    a housing enclosing a cooling zone, said cooling zone having an entrance region communicating with an exit region;
    a transport device extending though said housing for transporting workpieces along a transport direction through said entrance region, through said cooling zone and through said exit region;
    a heat exchanger arranged within said housing, said heat exchanger comprising an entry and an exit through which a first fluid flow is guided, and further comprising pipes for guiding a second fluid flow therethrough and for transferring heat between said first and second fluid flows;
    wherein said exit of said heat exchanger communicates with said cooling zone for supplying cooling air thereto, and wherein said entry of said heat exchanger communicates with said cooling zone for supplying warm air from said cooling zone to said heat exchanger and for transferring heat to said second fluid flow.

16. The cooling apparatus of claim 15, in which air supplied to said heat exchanger from said cooling zone has an inlet temperature of between 40° C. and 250° C.

17. The cooling apparatus of claim 15, wherein air removed at said entry region and supplied from said heat exchanger to said cooling zone again flows in a direction opposite to said transport direction.

18. The cooling apparatus of claim 17, further comprising:
a cool-air conducting duct being connected to said exit of said heat exchanger at one end thereof and to said cooling zone at a second end thereof.

19. The cooling apparatus of claim 18, wherein said cool-air conducting duct comprises a plurality of nozzles which are configured for injecting cooled air into said cooling zone opposite to said transport direction.

20. The cooling apparatus of claim 15, wherein said heat exchanger further comprises a fan for generating an air stream through said heat exchanger.

* * * * *

UNITED STATES PATENT AND TRADEMARK OFFICE
CERTIFICATE OF CORRECTION

PATENT NO.         : 8,286,365 B2                                              Page 1 of 1
APPLICATION NO.    : 12/797641
DATED              : October 16, 2012
INVENTOR(S)        : Gerd Wurster It is certified that error appears in the above-identified patent and that said Letters Patent is hereby corrected as shown below:

<u>Column 9</u>,
Line 45 (Claim 1), "though" should be -- through --.

<u>Column 10</u>,
Line 52 (Claim 15), "though" should be -- through --.
Line 65 (Claim 15), delete "heat".

Signed and Sealed this
Eighteenth Day of December, 2012

David J. Kappos
*Director of the United States Patent and Trademark Office*